United States Patent [19]

Stader et al.

[11] 3,874,371
[45] Apr. 1, 1975

[54] OTOSCOPE

[75] Inventors: Kenneth P. Stader, Simi Valley; Allan D. Le Vantine, Tarzana, both of Calif.

[73] Assignee: Cavitron Corporation, New York, N.Y.

[22] Filed: Jan. 11, 1974

[21] Appl. No.: 432,779

[52] U.S. Cl. .................................. 128/9, 350/286
[51] Int. Cl. .................................. A61b 1/06
[58] Field of Search .................. 128/6–9; 350/178, 187, 286

[56] References Cited
UNITED STATES PATENTS

| | | | |
|---|---|---|---|
| 1,767,266 | 6/1930 | Wappler et al. | 128/6 |
| 2,290,665 | 7/1942 | Arnesen | 128/6 |
| 3,543,746 | 12/1970 | Hotchkiss | 128/9 |
| 3,614,194 | 10/1971 | Harris | 350/286 X |

*Primary Examiner*—Richard A. Gaudet
*Assistant Examiner*—Henry S. Layton

[57] ABSTRACT

A novel otoscope for coaxially illuminating and viewing the interior of an ear having in combination a housing with an eyepiece at one end and a specula at the opposite end, a thick lens prism mounted between the eyepiece and the speculum, the thick lens prism functioning as a bi-convex thick lens to image the light in the region of view with a first spherical convex lens, along a light source axis directing the light from a bulb toward an internal reflecting surface of the prism at an angle of incidence greater than the critical angle to reflect the light along the optical viewing axis through the second spherical convex lens of the prism to image the light in the viewed region.

12 Claims, 5 Drawing Figures

FIG.2

PATENTED APR 1 1975  3,874,371

OTOSCOPE

BACKGROUND OF THE INVENTION

This invention relates to optical apparatus. More particularly this invention relates to a device characterized broadly under the generic class of medical optical devices as an endoscope and more specifically as an otoscope, that is, specifically an instrument used in viewing and treating the meatus of the external ear.

Briefly an otoscope is an instrument which may be considered as having three cooperating systems. These are a viewing system, an illuminating system to light up the area being viewed, and an instrumenting system enabling the viewer to probe the illuminated area. Thus all three systems generally share the same optical path in a compromising manner, to enable the holder of the instrument to view the meatus of the ear under satisfactory illumination while at the same time permitting a probe or other instrument to be inserted into the field of view and manipulated there. A simple, common type of otoscope familiar to most laymen is shown by U.S. Pat. No. 1,896,720 issued Feb. 7, 1933 to W. L. Patterson. This patent illustrates a common type used by physicians for at least a generation, as for instance as shown by U.S. Pat. No. 2,507,771 issued May 16, 1950 to H. B. Cole. It is clearly understood that whatever advances in such instrumentation are made depend solely on the instrumentation and not on the user or subject. Such advances are intended to lead to a more effective instrument providing if possible better viewing, more illumination, ease of use and handling in some regard over previously available instruments. Briefly, a distinct disadvantage of the aforesaid instrument is that the optical axis of the light directed toward the viewed region is not coaxial with the optical viewing axis resulting in shadowed portions in the region being viewed.

SUMMARY OF THE INVENTION

Accordingly we have invented an optical device, specifically an otoscope for illuminating and viewing a region, i.e., opening in a patient's body. The optical device comprises in combination a housing having an eyepiece at one end of the housing and of an optical viewing axis extending towards the region opposite the other end of the housing. A bi-convex thick lens prism is mounted in the housing with a first convex lens face out of the optical viewing axis, a second convex lens face coaxially with the viewing axis, and an internal reflecting surface for reflecting light entering the first lens towards the second lens on an axis coaxial with the viewing axis, light means are mounted on the housing for directing light at the first lens.

A detachable speculum is preferably mounted on the housing adjacent to region viewed. Additionally the light means is a battery pack detachably attached to the housing powering a lens end bulb directing light at a mirror mounted in the housing which reflects the light towards the first lens.

It is therefore an object of this invention to provide an optical device for illuminating and viewing a desired region with the optical axes for illumination and viewing being coaxial.

It is therefore another object of this invention to provide a novel device for viewing effectively small openings;

It is another object of the present invention to provide an instrument commonly known as an otoscope;

It is yet another object of the present invention to provide an otoscope having novel and improved illuminating means.

Still another object of the present invention is to provide an otoscope having an improved optical system.

Other objects and advantages of the device according to the present invention will be apparent to those skilled in the art from the brief description of the drawings and the preferred embodiment which follow.

DESCRIPTION OF THE PREFERRED EMBODIMENT

The otoscope according to our invention utilizes a novel thick lens prism to collect light, intensify the light and project the intensified light towards the region which it is desired to illuminate along the same optical axis as is used to view the illuminated region. In substance the thick lens prism comprises a prism having a first convex spherical lens face which directs light rays from a light source at an internal reflecting surface. The internal reflecting surface reflects the light rays towards a second convex spherical lens along the optical viewing axis, and further refracts the light. Thus an important function of the thick lens prism is to enable the light to be positioned out of the user's line of sight or the optical viewing axis. To achieve this the prism functions as a bi-convex "thick lens" which directs the light at the region viewed along the same optical axes.

The otoscope therefore provides optical viewing of a specific area of the body being examined while simultaneously providing superior illumination to this area. Since the otoscope is a particular and specialized class of device generally known as endoscopes it must operate in its specialized function to the best extent possible. For instance, conventional otoscopes of the type previously discussed have a variation between the line of sight and the path the illuminating beam of light follows and results in a shadow being cast on the viewing area. This may be bothersome where the smaller pediatric specula are used. Such a case is clearly shown in the hereinbefore cited Cole patent. The otoscope according to our invention provides for directing the illuminating light toward the imaged region along the same optical axis as is used to view the illuminated region, i.e., the otoscope functions as in a coaxial illuminating and viewing device.

Figure 1:
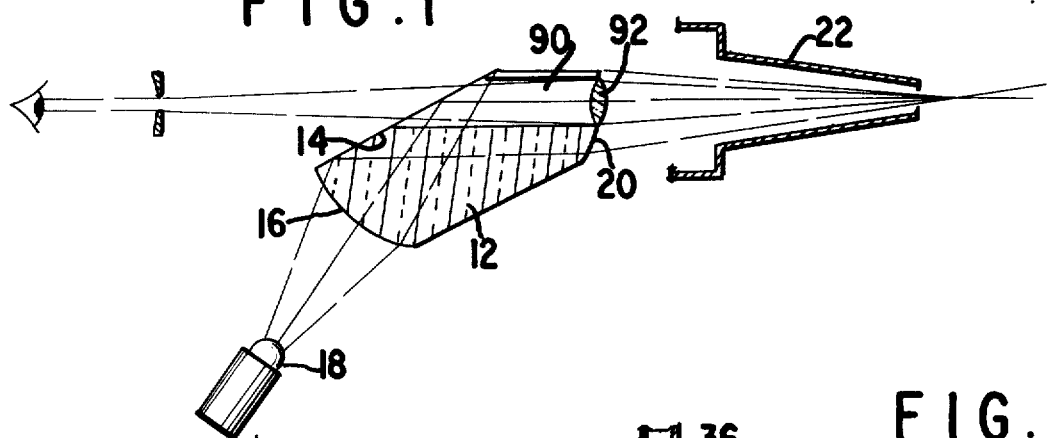
FIG. 1 is an optical diagram illustrating the lens system of the present invention.

To more clearly explain the functioning of the bi-convex thick lens prism of the present invention, reference is made to FIG. 1 of the drawings which diagrammatically shows one version of the optical system of the preferred embodiment. A bi-convex thick lens prism 12 is shown in elevation and may be described as having two convex lens surfaces and an internal reflecting surface for folding light directed from a first convex lens towards the optical axis of the second convex lens surface on the prism, so that the path or optical axis of the light through the second convex lens is coaxial with the optical viewing axis employed by one viewing the imaged region. Thus the thick lens prism also comprises an internal reflecting surface 14. The two convex lens surfaces constituting the bi-convex thick lens, are a first convex (spherical) lens 16 which directs light rays from a light source such as a lens-end bulb 18 and refracts the rays toward the internal reflecting surface 14 internally reflecting the light through a second convex lens 20 which is coaxial with the optical viewing axis. The second convex lens 20 acts to further refract the light rays towards the region which it is desired to illuminate. This region is bounded by a part of the instrument which is called a speculum 22. The speculum 22 is generally inserted into the body opening it is desired to examine, and in this instance the light for illuminating the opening has to pass through the speculum, as well as the reflected rays which are directed back to the viewer's eyes. In addition the user generally also desires to insert some small instrument into the area viewed and provision must also be made for this function.

Figure 2:
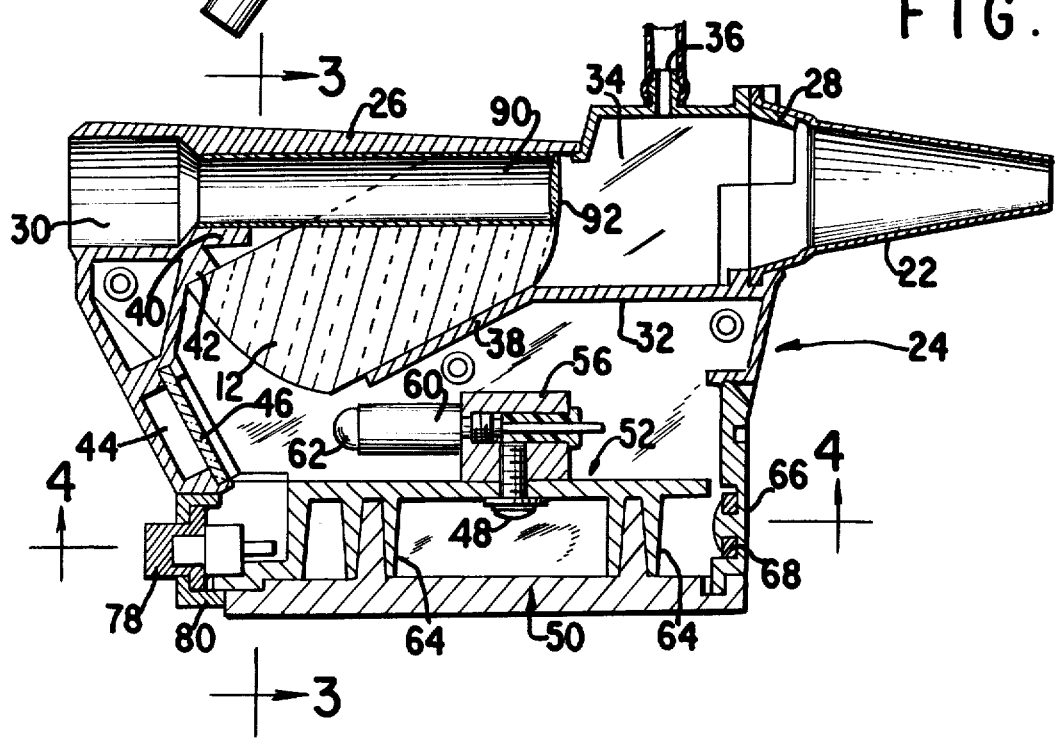
FIG. 2 is a sectional elevation of the otoscope according to the present invention.
Figure 3:
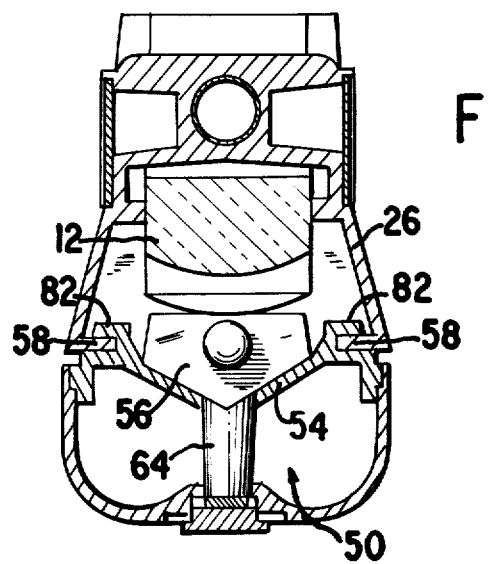
FIG. 3 is a cross-sectional view of the otoscope taken along section 3:3 of FIG. 2.
Figure 4:
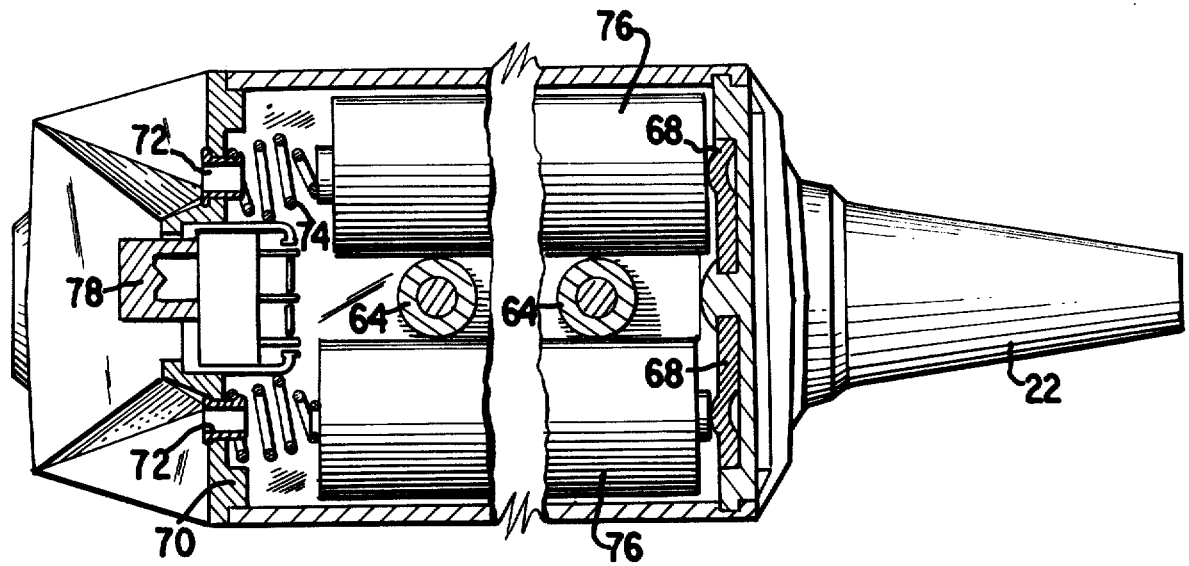
FIG. 4 is a cross-sectional view of the otoscope taken along section 4:4 of FIG. 2.

Referring now to FIG. 2 of the drawings, a preferred embodiment of the otoscope 24 is shown in sectional elevation. The otoscope 24 is formed of a housing 26 made from two plastic mirror imaged sides generally called optical heads with various molded partitions, slots, etc. to hold the internal components of the otoscope. Thus attached to the forward end of the housing is the specula 22, which is formed of a plastic or metal in a conical shape with openings at both its ends and is detachably insertable on the front end of the housing. At the rear end of the housing in direct line of sight with the speculum, an eyepiece 30 in the form of a large opening with a beveled face is molded in the housing. In use the user of the otoscope places one of his eyes opposite the eyepiece 30 at the opening thereof.

A shelf 32 is molded in the anterior part of the housing just below the level of the speculum projection. This shelf forms the bottom wall of a chamber designated as a pneumoscopy head 34. The pneumoscopy head is essentially an air tight chamber opening into the speculum to enable the physician to pressurize the area of the ear under examination. For this purpose a nipple 36 is formed on the upper side of the housing centering over and opening into the pneumoscopy head.

Extending rearwardly and down from the rear edge of the shelf 32 is an angled support 38 on which the thick lens prism rests. Similarly the structural molding forming the bottom of the eyepiece are molded with an optical tube bearing 40 extending forwardly from the eyepiece structure, and a prism retainer 42 extending downwardly from the anterior structure of the eyepiece.

As seen in FIG. 2 of the drawings the thick lens prism 12 has an upperportion cut away to provide clearance for the top of the housing 26 and is rigidly held in the housing by resting on the support 38 and being held in this position by the retainer 42 and the top of the housing 26.

To the rear of the housing 26 an alcove 44 is molded having retaining grooves for mounting a flat mirror 46 at an angle which will be described further hereinafter. The reflecting surface of the mirror 46 thereby faces the thick lens prism 12 at an angle. Below the shelf and the angled support 38, a light power pack 50 is removably mounted in the housing. The bottom of the housing therefore has on each side thereof, an angle mount 58 to which a selected light power pack 50 is detachably attached.

The power pack 50 comprises a molded casing 52 of substantially the same length and width as the bottom of the housing. More specifically the casing has a complexedly shaped gabled roof 54 on which a (bulb) socket bracket 56 is mounted by means of set screw 48. A socket 60 is attached to the bracket 56 in the direction facing the mirror 46. Detachably mounted in the socket is a lens end bulb 62 which acts to project a rather concentrated light (for its power requirements) toward the reflecting surface of the mirror 46. The casing is divided into two battery compartments by two interlocking columns 64, and has a forward wall 66 on which a metal contact strip 68 is mounted, and a back cover 70 on which two spring rivets 72 are located opposite the contact strip. On each of the spring rivets between the inside of the back cover 70 and the head of the rivet is a coil spring 74. It is clearly seen that a pair of miniature e batteries 76 of the dry cell type are insertable in the case between the terminals constituting the contact strip and two spring rivets, the batteries preferably being in series. Between the two spring rivets on the back cover there is mounted a switch 78 which is held in place by a switch cover 80. The switch has three terminals to which wires from the two spring rivets are attached, two wires (not shown) going to the socket bracket in the conventional manner to transmit electrical energy thereto to energize the bulb when the switch is pushed.

The casing has a slotted top side wall 82 which slides over the angle mounts 58 on each side of the housing 26. Thus it is seen that the power pack 50, or more colloquially a battery pack, is easily detachable from the housing allowing for ease of battery or bulb replacement or substitution of another light and battery pack such as one containing a more powerful bulb and four rather rather than two batteries as power sources.

Referring again to FIG. 2 an optical tube 90 is molded in the top portion of the housing between the eyepiece 30 and the pneumoscopy head. The thick lens prism 12 has a portion thereof missing to receive the optical tube which extends through the prism to a point just before the second convex lens surface of the prism. At the prism end of the optical tube a viewing lens 92 is mounted. This viewing lens 92 is a simple magnifying convex lens directly in the line of sight between the eyepiece and the opening of the specula and together with the thick lens prism acts to effectively seal the pneumoscopy head chamber of the otoscope.

In operation the user inserts the tip of the speculum into the opening which is to be examined, places his eye opposite the eyepiece and pushes the switch to turn on the light source. Light rays from the lens end bulb project towards the mirror which is positioned at an angle from the bulb. The mirror reflects the light towards the thick lens prism which acts to direct the light rays passing through the first convex lens face towards the internal reflecting surface. The light is directed towards the internal reflecting surface of the prism at an angle of incidence greater than the critical angle and is reflected towards the second lens face, further concentrated there by refraction and directed toward the opening of the specula 22.

At the same time the user is able to view the illuminated area without interference to his line of sight and without the casting of any shadows which would result if the line of sight of the viewer was not the same as the light emanating from the thick lens prism. Preferably the viewing lens has a magnification factor of 2½ so as to also magnify the area illuminated.

To reiterate light is provided by a source such as a lens end bulb, which light is directed by the lens on the bulb towards the first convex lens face of the prism along a light axis which is effectively removed from the optical viewing axis. The first convex lens face on the prism is spherical in shape as is the second convex lens face. Neither convex lens has the same radius of curvature necessarily. The light entering the prism through the first convex lens face is directed by lens refraction toward the internal reflecting surface of the prism at an angle of incidence greater than the critical angle which causes the light to be internally reflected in the prism at an angle coincident and therefore coaxial with the viewing axis employed by the user.

Figure 5:
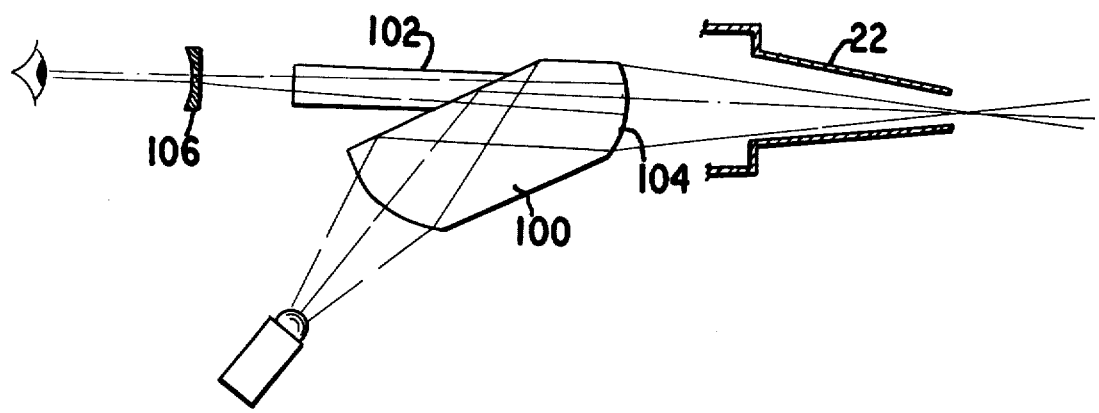
FIG. 5 is an optical diagram illustrating a variation of the lens system of the present invention.

Another version of the lens system shown in FIG. 1 of the drawing is presented in FIG. 5. The modification illustrated by the latter figure utilizes a thick lens prism 100 which is substantially identical to that described hereinbefore except that a stem 102 is molded onto the prism 100 in the axis of the viewer's line of sight, while a second lens face 104 of the prism acts both as a projector of the concentrated light rays for illuminating, and magnifying the viewed area. An optional negative lens 106 may be placed in the area of the eyepiece to further modify the image being seen by the viewer.

Thus the viewing system shown in FIG. 5 employs the second convex lens 104 of the prism as a positive lens. The optical view axis is through the stem made of the same optical material as the prism such as lucite and which is continuous with the internal reflecting surface of the prism thereby permitting light to pass through the stem and into the prism. The end of the stem may be designed in conjunction with the second convex lens 104 to function as a single magnifying system along the optical viewing axis. It can also be designed as a Galilean telescope utilizing the negative lens 106 as an adjustable eyepiece.

Having thus fully described the preferred embodiment of the device according to the invention and wishing to cover those variations and modifications which would be apparent to those skilled in the art, but without departing from either the spirit or scope thereof.

I claim:

1. An optical device comprising
   a housing having an eye piece at one end, said eye piece being at one end of an optical viewing axis extending towards a region to be viewed opposite the other end of the housing,
   a bi-convex thick lens prism mounted in said housing, said prism having a first convex lens face on one side, a second convex lens face on an opposite side and an internal reflecting surface intermediate said two convex lens faces,
   light means mounted in said housing for directing light at said first convex lens faces, said first convex lens directing the light at said internal reflecting surface at an angle of incidence greater than the critical angle, thereby causing the light to be internally reflected, said internal reflecting surface being mounted at such an angle in said housing intermediate the optical viewing axis to direct said reflected light along an axis which is coaxial with the optical viewing axis and through said second convex lens whereby the light illuminates the region to be viewed along the optical viewing axis, and
   an optical tube located in said housing along the optical viewing axis, said optical tube having viewing lens means for modifying the image of the viewed region.

2. The optical device of claim 1 which additionally comprises a mirror mounted in said housing between said light means and said first convex lens face, said mirror being mounted at an angle to reflect light from said light means towards the first lens face.

3. The optical device according to claim 2 wherein said light means is a lens end bulb.

4. The optical device according to claim 3 wherein said light means additionally comprises a battery pack detachably mounted on said housing, said battery pack also mounting said lens end bulb.

5. The optical device of claim 1 wherein a speculum is mounted on said housing opposite the eyepiece.

6. An optical device comprising
   a housing having an eye piece at one end, said eye piece being at one end of an optical viewing axis extending towards a region to be viewed opposite the other end of the housing,
   a bi-convex thick lens prism mounted in said housing said prism having a first convex lens face on one side, a second convex lens face on an opposite side and an inernal reflecting surface intermediate said two convex lens faces,
   light means mounted in said housing for directing light at said first convex lens face, said first convex lens directing the light at said internal reflecting surface at an angle of incidence greater than the critical angle, thereby causing the light to be internally reflected, said internal reflecting surface being mounted at such an angle in said housing intermediate the optical viewing axis to direct said reflected light along an axis which is coaxial with the optical viewing axis and through said second convex lens whereby the light, illuminates the region to be viewed along the optical viewing axis, said thick lens prism additionally comprising an optical viewing means for directing an image along the optical viewing axis between the region viewed and the eye piece.

7. The optical device according to claim 6 wherein said optical viewing means is a stem integrally attached to said prism adjacent to a portion of the internal reflecting surface.

8. The optical device according to claim 6 wherein a viewing lens is mounted in said optical tube for modifying the viewed image.

9. The optical device of claim 6 wherein a speculum is mounted on said housing opposite the eye piece.

10. The optical device of claim 6 which additionally comprises a mirror mounted in said housing between said light means and said first convex lens face, said mirror being mounted at an angle to reflect light from said light means towards the first lens face.

11. The optical device of claim 10 wherein said light means is a lens end bulb.

12. The optical device of claim 10 wherein said light means additionally comprises a battery pack detachably mounted on said housing, said battery pack also mounting a lens end bulb.

* * * * *